United States Patent
Shiba et al.

(10) Patent No.: US 8,298,720 B2
(45) Date of Patent: *Oct. 30, 2012

(54) PROTON CONDUCTOR

(75) Inventors: Tadahiro Shiba, Shiki (JP); Hitoshi Iwadate, Iruma-gun (JP)

(73) Assignee: Honda Motor Co. Ltd., Tokyo (JP)

(*) Notice: Subject to any disclaimer, the term of this patent is extended or adjusted under 35 U.S.C. 154(b) by 1215 days.

This patent is subject to a terminal disclaimer.

(21) Appl. No.: 12/053,196

(22) Filed: Mar. 21, 2008

(65) Prior Publication Data

US 2008/0233453 A1 Sep. 25, 2008

(30) Foreign Application Priority Data

Mar. 23, 2007 (JP) ................... 2007-076678

(51) Int. Cl.
*H01M 8/10* (2006.01)
*B01J 49/00* (2006.01)

(52) U.S. Cl. .......................... 429/492; 521/25
(58) Field of Classification Search ............ 429/493
See application file for complete search history.

(56) References Cited

U.S. PATENT DOCUMENTS

| | | | |
|---|---|---|---|
| 3,759,738 A | 9/1973 | Misumi et al. | |
| 4,720,345 A * | 1/1988 | Linder et al. | 210/650 |
| 5,648,186 A * | 7/1997 | Daroux et al. | 429/308 |
| 6,214,891 B1 | 4/2001 | Schneller et al. | |
| 6,759,441 B1 | 7/2004 | Kerres et al. | |
| 6,977,122 B2 | 12/2005 | Colombo et al. | |
| 7,344,791 B1 * | 3/2008 | Yamaguchi et al. | 429/492 |
| 7,378,471 B2 | 5/2008 | Kim et al. | |
| 7,455,934 B1 | 11/2008 | Araki et al. | |
| 7,781,535 B2 | 8/2010 | Komiya et al. | |

(Continued)

FOREIGN PATENT DOCUMENTS

JP 2002-280029 9/2002

(Continued)

OTHER PUBLICATIONS

"Current Patents of Dendrimers and Hyperbranched Polymers in Membranes", Recent Patents on Chemical Engineering 2008, 1, 41-51, Wang et al.*

(Continued)

*Primary Examiner* — Patrick Ryan
*Assistant Examiner* — Lucas O Donnell
(74) *Attorney, Agent, or Firm* — Nelson Mullins Riley & Scarborough LLP; Anthony A. Laurentano

(57) ABSTRACT

A proton conductor is formed of a porous body as a substrate and proton-conducting polymer covalently bonded to inner surfaces of pores of the porous body. The proton-conducting polymer comprises a main chain and a plurality of branched side chains extending radially therefrom. The branched side chains are each bonded to a proton-conducting salt at the end. The proton-conducting polymer has a substantially cylindrical structure in which the salts can be circumscribed by a virtual circle having a center on the cross-sectional center of the main chain such that a radial direction of the virtual circle is perpendicular to a longitudinal direction of the main chain. The salts are located on the peripheral wall of the substantially cylindrical structure. Protons are transferred between the adjacent salts, so that a conduction channel is formed on the peripheral wall of the cylindrical structure.

9 Claims, 5 Drawing Sheets

U.S. PATENT DOCUMENTS

| | | |
|---|---|---|
| 2003/0035991 A1 | 2/2003 | Colombo et al. |
| 2005/0112440 A1 | 5/2005 | Kim et al. |
| 2005/0143530 A1* | 6/2005 | Iwadate et al. ............ 525/326.2 |
| 2006/0269815 A1* | 11/2006 | Goldbach et al. ............... 429/33 |
| 2008/0200629 A1* | 8/2008 | Shiba et al. ................ 526/317.1 |

FOREIGN PATENT DOCUMENTS

| | | |
|---|---|---|
| JP | 2004-532211 | 10/2004 |
| JP | 2005-44550 | 2/2005 |
| JP | 2005-171086 | 6/2005 |
| JP | 2005-251539 | 9/2005 |
| JP | 2006-260962 | 9/2006 |
| JP | 2008-202025 | 9/2008 |
| JP | 2008-270177 | 11/2008 |
| WO | 02/079299 A1 | 10/2002 |

OTHER PUBLICATIONS

Structures and Transport Properties of Hydrated Water-Soluble Dendrimer-Grafted Polymer Membranes for Application to Polymer Electrolyte Membrane Fuel Cells: Classical Molecular Dynamics Approach, J. Phys. Chem. C 2007, 111, 2759-2769, Jang et al.*

U.S. Appl. No. 12/009,951, filed Jan. 22, 2008.

Japanese Office Action for Application No. 2007-289410, dated Sep. 6, 2011.

* cited by examiner

FIG. 5

|  | GENERATION NUMBER | CONDUCTIVITY [S/cm] |
|---|---|---|
| EXAMPLE 1 | G3 | $9.2 \times 10^{-5}$ |
| EXAMPLE 2 | G3 | $8.6 \times 10^{-5}$ |
| EXAMPLE 3 | G2 | $4.2 \times 10^{-5}$ |
| COMPARATIVE EXAMPLE | − | $3.7 \times 10^{-6}$ |

PROTON CONDUCTOR

BACKGROUND OF THE INVENTION

1. Field of the Invention

The present invention relates to a proton conductor suitably usable as an electrolyte membrane for hydrogen fuel cells, direct methanol fuel cells, and the like.

2. Description of the Related Art

A fuel cell is produced by the steps of interposing an electrolyte between an anode and a cathode, sandwiching thus obtained electrolyte-electrode joined assembly between a pair of separators to form a unit cell, and stacking a predetermined number of such unit cells. The electrolyte may be a proton-conducting polymer, which functions to transfer protons generated on the anode to the cathode.

A perfluoropolymer and an organic substance prepared by adding sulfonic acid to an aromatic hydrocarbon are known as the proton-conducting polymer. The sulfonic acid-added organic substance cannot show a sufficient proton conductivity singly, and thereby is used under wet condition to achieve a practically preferred conductivity. Therefore, in the case of using the proton-conducting polymer of the sulfonic acid-added organic substance as the electrolyte in the fuel cell, a humidifier is used for humidifying both reaction gases (a fuel gas for the anode and an oxidant gas for the cathode) to maintain the electrolyte under the wet condition.

When moisture is excessively supplied to the reaction gases, reaction gas passages are disadvantageously obstructed by the moisture, whereby the supply rates of the gases are lowered to cause deterioration in the electricity generation of the fuel cell. A method for appropriately controlling such a moisture supply amount is proposed in Japanese Laid-Open Patent Publication No. 2002-280029.

When the fuel cell is used at an environmental temperature below the freezing point, the moisture supplied to the reaction gases is frozen. In this case, to prevent the freeze, the fuel cell is generally heated by a large external heater and then driven (see Japanese Laid-Open Patent Publication No. 2006-260962).

As described above, when the fuel cell containing the electrolyte of the sulfonic acid-added organic substance is driven, it is necessary to strictly control the reaction gas humidity and the driving temperature. Further, since the external humidifier and heater are needed, the fuel cell system is disadvantageously large, resulting in increased equipment investment.

SUMMARY OF THE INVENTION

A general object of the present invention is to provide a proton conductor capable of exhibiting excellent proton conductivity even under dry conditions.

A principal object of the present invention is to provide a proton conductor usable, for example, in fuel cell systems without controlling reaction gas humidity supplied thereto.

Another object of the present invention is to provide a proton conductor capable of simplifying, for example, fuel cell systems.

A further object of the present invention is to provide a proton conductor capable of lowering equipment investment, for example, for fuel cell systems.

According to an aspect of the present invention, there is provided a proton conductor comprising a porous body having pores for holding proton-conducting polymers therein, the proton-conducting polymers each comprising a linear main chain and a plurality of branched side chains. Each of the branched side chains is bonded to the main chain at one end and bonded to a proton-conducting salt at the other end. The branched side chains extend radially from the main chain, and the salts of the different branched side chains are circumscribed by a virtual circle having a center on the cross-sectional center of the main chain such that a radial direction of the virtual circle is perpendicular to a longitudinal direction of the main chain. The proton-conducting polymers that are adjacent to each other have the virtual circles which contact each other. The proton-conducting polymers are covalently bonded to the pores.

The virtual circle extends along the longitudinal direction of the main chain, and thus the proton-conducting polymer has a substantially cylindrical structure. The salts are located on the peripheral wall of the substantially cylindrical structure, and protons are transferred between the salts to achieve the proton conductivity. Therefore, moisture is not needed to achieve the proton transfer. In other words, the proton-conducting polymer can show excellent proton conductivity even under dry conditions.

Thus, in the case of using the porous body containing proton-conducting polymers as an electrolyte membrane in a fuel cell, protons are conducted in the electrolyte membrane from the anode to the cathode, even reaction gases are not specially humidified. Therefore, the reaction gases do not have to be specially humidified. Consequently, the problem of obstruction in reaction gas passages can be solved in this case. It is not necessary to strictly control the reaction gas humidity. Further, because it is not necessary to supply the moisture to the reaction gases, there is no need to worry about the problem of the freeze. Therefore, even when the fuel cell is used at an environmental temperature below the freezing point, the fuel cell can be driven without heating.

For the above reasons, the fuel cell can be used without humidifiers and heaters. Thus, the fuel cell can be used in a simple system with low equipment investment.

Further, since the proton-conducting polymers are retained in the porous body by covalent bonds, the virtual circles of the proton-conducting polymers that are adjacent to each other can be kept in contact with each other for a long time, ensuring excellent proton conductivity for a long time.

A dendrimer prepared by repeatedly bonding a repeating unit can be preferably used as the branched side chain. In this case, the proton-conducting polymer can be easily produced. Further, a distance between adjacent salts is shortened in the polymer by repeatedly bonding a repeating unit, so that the proton transfer between the salts is accelerated, to further improve the proton conductivity.

It is preferred that the salt is derived from sulfonic acid and a primary or secondary amine. In this case, the resultant proton-conducting polymer is excellent in the proton conductivity and heat resistance.

The acids and bases bonded to the ends of the branched side chains do not always have to be in the salt state, and the acids and bases bonded to part of the ends of the branched side chains may be in the acid or base state. However, when a corresponding base or acid for forming the salt with the acid or base is excessively present in the free state, the vapor pressure is increased, so that the fuel cell containing the proton-conducting polymer as an electrolyte is often poor in operational stability at high temperature. It is preferred in view of this problem that the amount of the corresponding base or acid is 1 equivalent or less, per 1 equivalent of the acid or base bonded to the end of each branched side chain.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a table showing the proton conductivities of samples according to Examples 1 to 3 and Comparative Example.

DESCRIPTION OF THE PREFERRED EMBODIMENTS

A preferred embodiment of the proton conductor of the present invention will be described in detail below with reference to the drawings.

Figure 1:
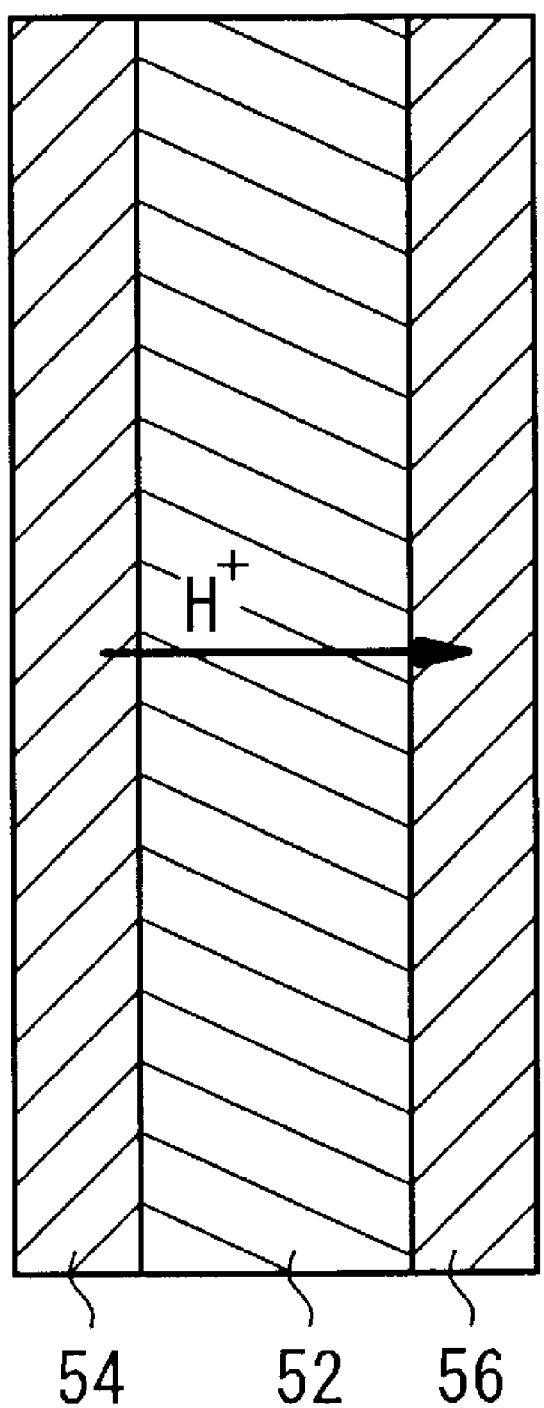
FIG. 1 is an illustrative, vertical cross-sectional view showing a main part of an electrolyte electrode assembly.

FIG. 1 is an illustrative, vertical cross-sectional view showing a main part of an electrolyte electrode assembly 50 of a unit cell of a hydrogen fuel cell or a direct methanol fuel cell. In the electrolyte electrode assembly 50, an anode 54 is formed on one end surface of an electrolyte membrane 52, and a cathode 56 is formed on the other end surface of the electrolyte membrane 52. In other words, the electrolyte electrode assembly 50 comprises the anode 54, the cathode 56 and the electrolyte membrane 52 interposed therebetween.

The electrolyte membrane 52 is made of the proton conductor according to the present embodiment. As shown in the enlarged view in FIG. 2, the proton conductor is formed of proton-conducting polymers 10 held in pores 60 that are positioned in series three-dimensionally in a porous body 58.

The porous body 58 as a substrate is not limited as long as it can be bonded to the proton-conducting polymers 10 via a covalent bond, that is, as long as the porous body 58 and the proton-conducting polymers 10 form the covalent bond together. The porous body 58 may be an organic substance including a polymer or an inorganic substance. Preferable examples of the organic substance include fluorine resins such as polytetrafluoroethylene (PTFE), polyimide, polybenzoazole, polyethylene, polyethylene terephthalate, polyetheretherketone, etc. Preferable examples of the inorganic substance include silicon oxide (silica), aluminum oxide (alumina), zeolite, zirconium phosphate, glass nonwoven fabrics.

The porous body 58 preferably has a porosity of 20% to 98% by volume. When the porosity is less than 20% by volume, the volume of the pores 60 is too small to hold a sufficient amount of proton-conducting polymers 10, making it difficult to ensure excellent proton conductivity. On the other hand, if the porosity exceeds 98% by volume, because the mechanical strength of the porous body 58 becomes low, the porous body 58 may be damaged when stacked unit cells are tightened.

The thickness of the porous body 58 is not particularly limited. However, when used as the substrate of the electrolyte membrane of a fuel cell as in the present embodiment, the thickness of the porous body 58 is preferably 10 to 100 μm.

Figure 3:
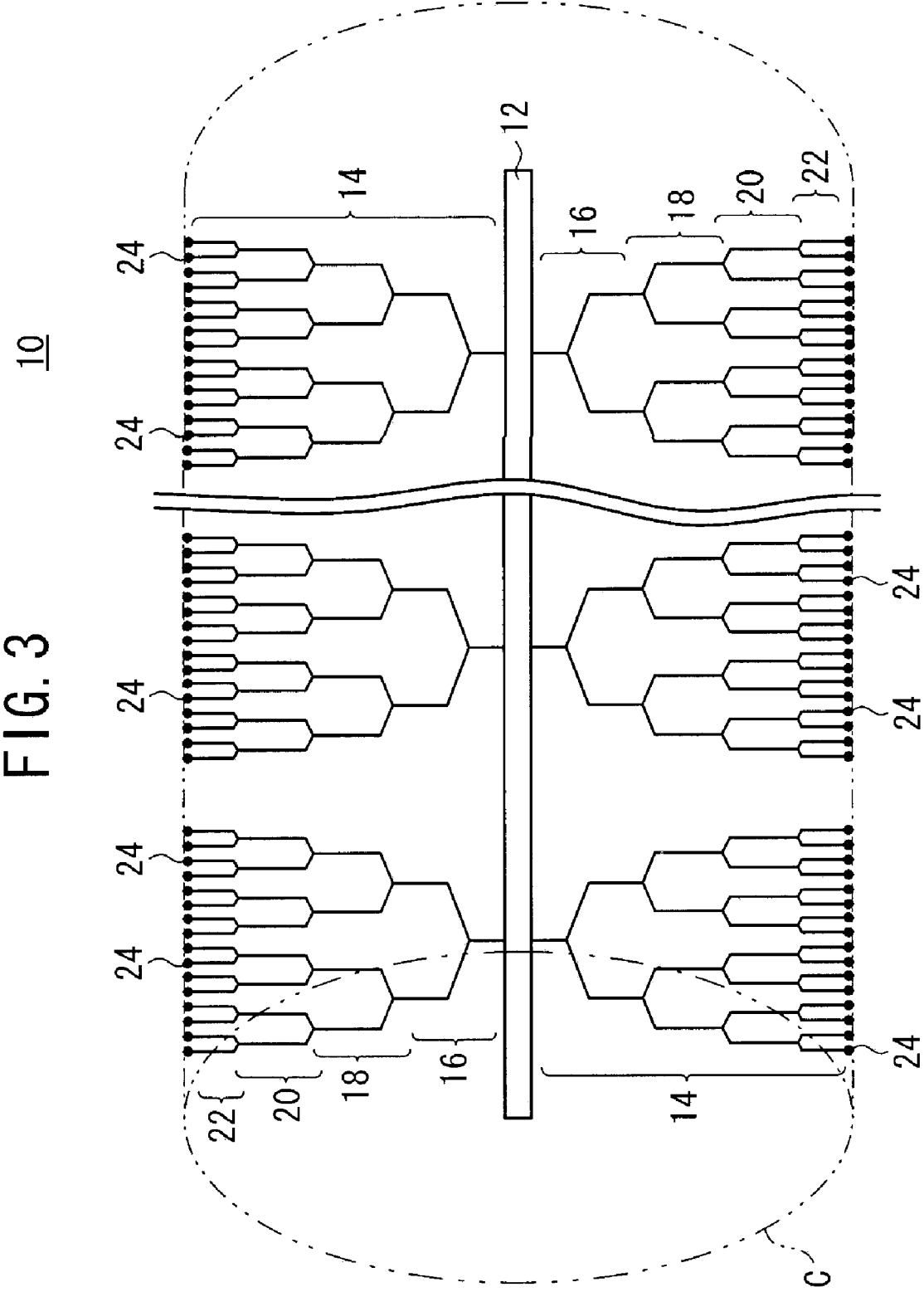
FIG. 3 is an explanatory, structural view showing a proton-conducting polymer contained in the electrolyte membrane shown in FIG. 2 along the longitudinal direction.
Figure 4:
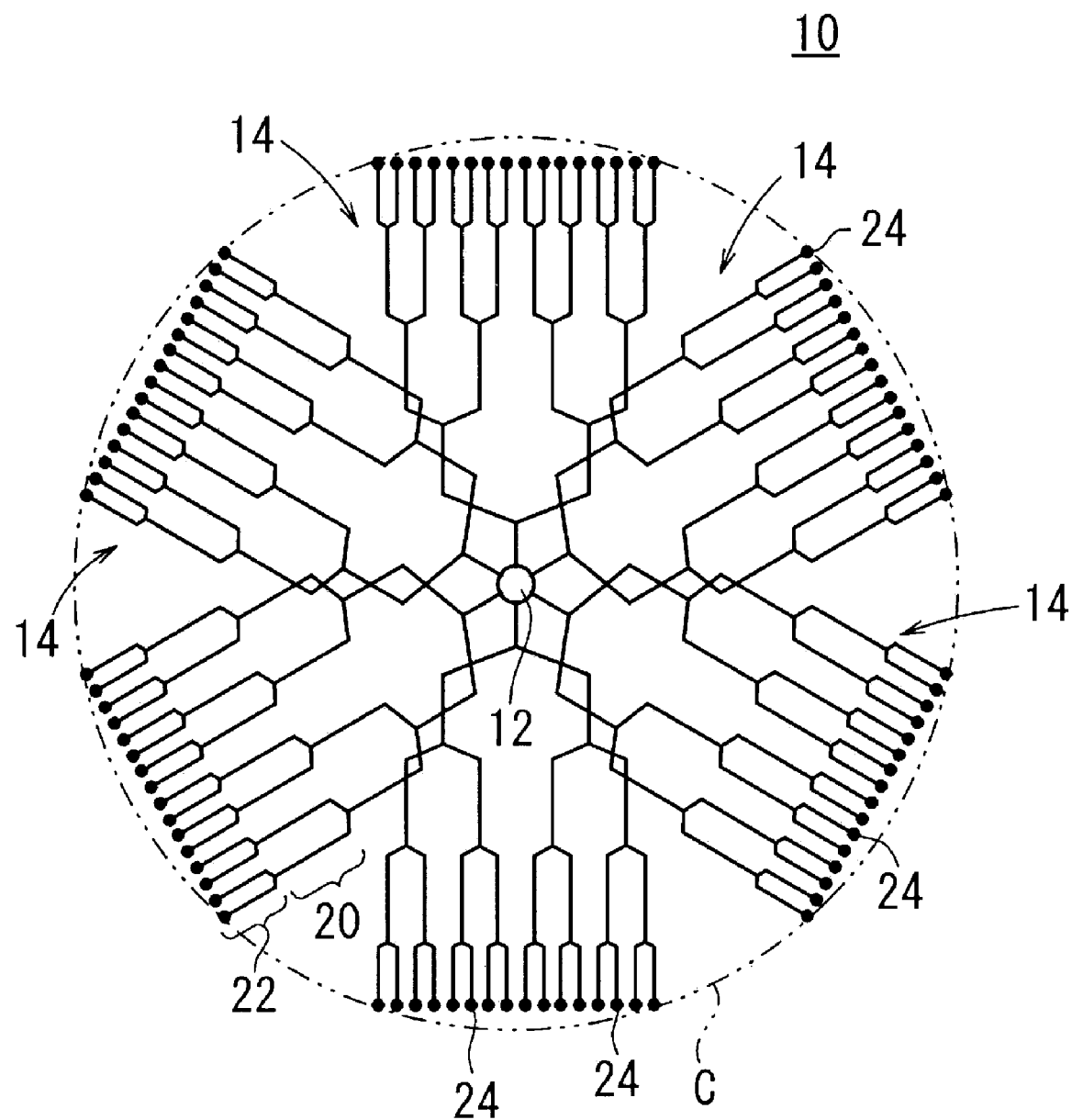
FIG. 4 is a front view showing the proton-conducting polymer of FIG. 3.

FIG. 3 is an explanatory, schematic structural view showing the proton-conducting polymer 10 along the longitudinal direction, and FIG. 4 is a front view of the proton-conducting polymer 10. The proton-conducting polymer 10 has a main chain 12 and a plurality of branched side chains 14 bonded thereto.

The main chain 12 is not particularly limited as long as it can linearly extend and can be bonded to the branched side chains 14. The main chain 12 preferably comprises a hydrocarbon polymer, and specific examples thereof include aliphatic hydrocarbon polymers prepared by polymerizing a monomer having a double bond, such as polystyrene resins, polyethylene resins, polyacrylic resins, polymethacrylic resins, polyvinyl resins, and polyallyl resins.

The main chain 12 may comprise a resin having a main-chain heteroatom, such as a polyester, polyamide, or polyether resin, and may comprise a fluororesin such as a polytetrafluoroethylene or polyfluorovinylidene resin. Further, the main chain 12 may comprise an aromatic polymer such as a polyphenylene, polyphenylene ether, polyphenylene ether sulfone, polyphenylene ether ketone, polyphenylene amide, or polyphenylene ester resin, and may comprise a heterocyclic polymer such as a polybenzimidazole, polybenzoxazole, or polybenzothiazole resin.

In this embodiment, each of the branched side chains 14 has a structure divided into a first-generation branch 16 bonded directly to the main chain 12, second-generation branches 18 bonded to and branched from the first-generation branch 16, third-generation branches 20 bonded to and branched from the second-generation branches 18, and fourth-generation branches 22 bonded to and branched from the third-generation branches 20. The first-generation branches 16, the second-generation branches 18, the third-generation branches 20, and the fourth-generation branches 22 preferably have the same structures, though one or more branches thereof may be different. Thus, each of the branched side chains 14 comprises a dendrimer provided by repeatedly bonding a repeating unit in this embodiment.

Preferred examples of the branches 16, 18, 20, 22 include aliphatic esters, aromatic esters, aliphatic amines, aliphatic ethers, aromatic ethers, aliphatic amides, aromatic amides, saturated hydrocarbons, and fluorocarbons. The branches of different generations may be connected by a multivalent atom such as a carbon, nitrogen, silicon, or phosphorus atom, an aromatic ring such as a benzene ring, a heterocycle such as an imidazole ring, or an aliphatic ring such as a cyclohexane ring.

A proton-conducting salt 24 is bonded to the end of each fourth-generation branches 22 in the branched side chains 14. Thus, each branched side chain 14 is bonded to the main chain 12 at the end of the first-generation branch 16, and has the proton-conducting salt 24 at the end of each fourth-generation branch 22.

The salt 24 is preferably derived from a Brønsted acid and an amine. Examples of the Brønsted acids include sulfonic acid, phosphoric acid, and phosphonic acid, and examples of the amine include ammonia, aliphatic amines, alicyclic amines, and nitrogen-containing heterocyclic compounds such as imidazole, triazole, and pyridine. It is preferred that the salt 24 is derived from sulfonic acid and a primary or secondary amine from the viewpoint of improving the proton conductivity and heat resistance of the proton-conducting polymer 10.

One end of the first-generation branch 16 in each branched side chain 14 is bonded to an optional position of the main chain 12. Thus, the branched side chains 14 are not arranged in a particular direction, and extend randomly from the main chain 12. In other words, the branched side chains 14 extend radially from the main chain 12 as shown in FIG. 4. The branches 18, 20, 22 are spread three-dimensionally.

A virtual circle C can be formed by connecting the salts 24. Thus, the salts 24 are circumscribed by the virtual circle C having a center on the cross-sectional center of the main chain 12. The virtual circle C can extend along the longitudinal direction of the main chain 12, and thus the proton-conducting polymer 10 can have a substantially cylindrical structure. Consequently, the proton-conducting polymer 10 substantially has a shape of a cylinder, the bottom surfaces of the cylinder have the centers on the main chain 12 in cross-section, and the salts 24 are located on the peripheral wall of the cylinder.

All ends of the fourth-generation branches 22 in the branched side chains 14 do not always have to be bonded to the salt 24, and part of the ends of the fourth-generation branches 22 may be bonded to an acid or base. However, when a corresponding base or acid for forming the salt 24 with the acid or base is excessively present in the free state, the vapor pressure is increased, so that, for example, the fuel cell containing the proton-conducting polymer 10 as an electrolyte is often poor in operational stability at a high temperature. It is preferred in view of this problem that the amount of the corresponding base or acid is 1 equivalent or less, per 1 equivalent of the acid or base bonded to the end of each fourth-generation branch 22.

Figure 2:
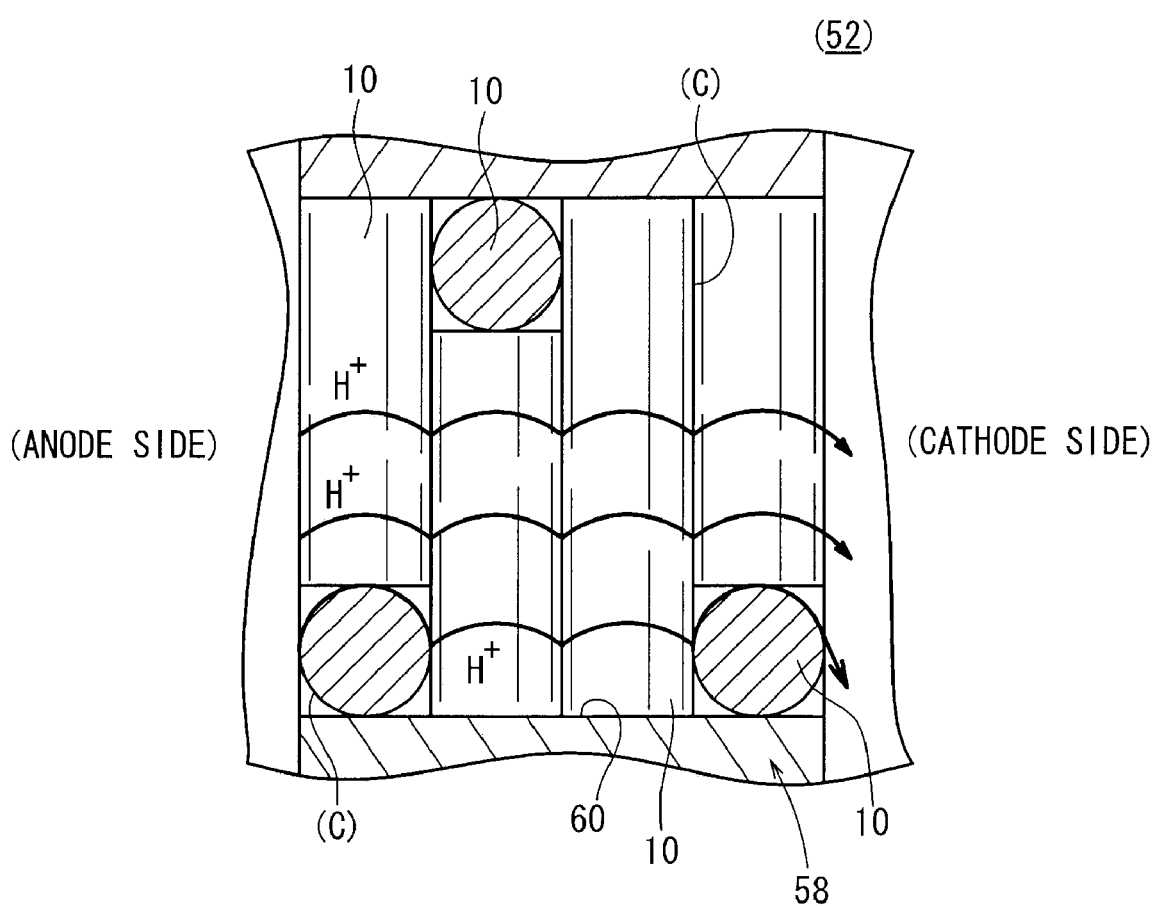
FIG. 2 is an illustrative enlarged view showing a main part of an electrolyte membrane of the electrolyte electrode assembly shown in FIG. 1.

The proton-conducting polymers 10 having the above structure are held in the pores 60 of the porous body 58 (see FIG. 2) such that they are bonded to the pores 60 via covalent bonds. As shown in FIG. 2, since the proton-conducting polymers 10 positioned adjacent to each other have virtual circles which contact each other in the pores 60 of the electrolyte membrane (proton conductor), protons are sequentially transferred between the adjacent salts 24 in the pores 60 to achieve the proton conduction. Thus, a conduction channel is formed on the peripheral wall of the substantially cylindrical virtual structure.

It is clear from the above description that moisture is not particularly required in the proton conduction. Thus, reaction gases for the fuel cell using the proton-conducting polymer 10 do not have to be moistened (humidified). Consequently, the above described problem of obstruction in reaction gas passages can be solved, and it is not necessary to strictly control the reaction gas humidity.

Further, in the present invention, it is not necessary to supply the moisture to the reaction gases, so that there is no need to worry about the freeze of the moisture in the reaction gases. Therefore, even when the fuel cell containing the proton-conducting polymer 10 is used at an environmental temperature below the freezing point, the fuel cell can be driven without heating.

Furthermore, the fuel cell can be used without humidifiers and heaters. Thus, the fuel cell can be used in a simple system with low equipment investment.

The dendrimer shown in FIGS. 3 and 4 has a branch generation number of 4, though the generation number is not particularly limited. As the generation number is increased, the distances between the adjacent branches are shortened to accelerate the proton conduction. The generation number is therefore preferably 2 or more.

For example, the proton-conducting polymer can be produced by the following first to third production methods. Explanation of each method is made by taking the following case as an example: in the pore 60, porous PTFE is selected as the porous body 58 to obtain the proton-conducting polymer 10 having polyhydroxyethyl methacrylate (PHEMA) as the main chain 12 and the dendrimer moieties containing the repeating unit of 2,2-bishydroxymethylpropionic acid (bis-MPA) as the branched side chains 14. The PHEMA and the bis-MPA have the following structural formulae, respectively.

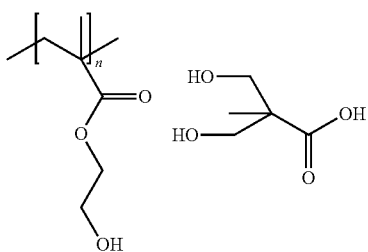

The first production method bonds the main chain 12 of the proton-conducting polymer 10 to the inner surface of the pore 60, and then bonds the branched side chains 14 to the main chain 12. In this method, the porous PTFE is irradiated with plasma first so as to generate radicals on the inner surfaces of the pores 60 of the porous PTFE. Then, the porous PTFE is immersed in a hydroxyethyl methacrylate solution to start radical-initiated polymerization of the hydroxyethyl methacrylate. As a result, the main chains 12 of PHEMA that are bonded to the inner surfaces of the pores 60 via covalent bonds are formed.

On the other hand, the branched side chains 14 are prepared. bis-MPA has one carboxyl group and two hydroxyl groups, so that the molecules of the repeating unit can be bonded by dehydration condensation to form a branched dendrimer, i.e., a branched side chain 14 having a carboxyl group at the end. The branch generation number of the branched side chain 14 corresponds to the repeat count of the dehydration condensation.

Next, the porous PTFE is immersed in a solution of the dendrimer of bis-MPA that is dissolved in an appropriate solvent, for example, and then heated, so as to bond the branched side chains 14 to the main chain 12 bonded to the inner surface of the pore 60 of the porous PTFE.

The hydroxyl groups at the end of the branched side chains 14 may be converted to sulfonic acid groups. In this step, the polymer may be dehydration-condensed with sulfoacetic acid such that the hydroxyl groups of the dendrimer moieties form ester bonds with the carboxyl groups of the sulfoacetic acid molecules, to obtain the branched side chains 14 having the sulfonic acid groups. Then, methylamine may be added to the polymer and reacted with the sulfonic acid groups to obtain the branched side chains 14 having terminal sulfonic acid methylamine salt groups.

Alternatively, the polymer may be dehydration-condensed with a sulfoacetic acid methylamine salt such that the hydroxyl groups of the dendrimer moieties form ester bonds with the sulfoacetic acid methylamine salt. The end groups bonded to the branched side chains 14 may be converted to amino groups first, and then the amino groups may be reacted with methanesulfonic acid to form a methanesulfonic acid amine salt.

The proton-conducting polymer 10 can be produced by the above steps in the first production method.

In a second production method, the main chain 12 of the proton-conducting polymer 10 is bonded to the inner surface of the pore 60, and then side chains are sequentially bonded to the main chain 12 to grow into the branched side chains 14.

As in the first production method, the porous PTFE is irradiated with plasma first so as to generate radicals on the inner surfaces of the pores 60 of the porous PTFE. Then, the porous PTFE is immersed in a hydroxyethyl methacrylate solution to polymerize the hydroxyethyl methacrylate. As a result, the main chains 12 of PHEMA that are bonded to the inner surface of the pore 60 via covalent bonds are formed.

Next, bis-MPA may be ester-bonded to the PHEMA (the main chain 12) by dehydration condensation to form bis-MPA side chains. The dehydration condensation is repeatedly carried out, so that the bis-MPA molecules are sequentially connected via ester bonds to form the dendrimer, i.e., branched side chains 14.

Then, the salts 24 may be formed at the ends of the branched side chains 14 in the same manner as in the first production method, whereby the proton-conducting polymers 10 are produced.

In the third production method, polymerization initiating points are formed on the inner surfaces of the pores 60. Then, after monomers having the branched side chains 14 are bonded to the polymerization initiating points, the monomers are polymerized to form the main chain 12. In this method, the above dendrimer may be prepared in the same manner as the first production method. Then, the dendrimer may be ester-bonded to hydroxyethyl methacrylate by dehydration condensation to obtain a monomer (a macromer) having the branched side chain 14. The macromer thus obtained is dissolved in a solvent of methanol, etc. to prepare a solution.

On the other hand, the porous PTFE is irradiated with plasma first so as to generate radicals on the inner surfaces of the pores 60. Then, the porous PTFE is immersed in the above-mentioned solution to start radical-initiated polymerization of the hydroxyethyl methacrylate. Then, the main chain 12 of PHEMA bonded via a covalent bond to the inner surface of the pore 60 is formed. As a matter of course, the branched side chains 14 of the above-mentioned dendrimer are bonded to the main chain 12.

Further, in the same manner as in the first and second methods, the proton-conducting polymers 10 are formed in the pores 60 of the porous PTFE by forming the salts 24 at the ends of the branched side chains 14.

Example 1

A porous PTFE having a porosity of 80% by volume was irradiated with plasma in an argon atmosphere at 0.2 Torr. The high frequency output was 30 W, and the irradiation time was 3 minutes.

The porous PTFE was immersed in an aqueous solution containing 5% by weight of hydroxyethyl methacrylate, and heated at 70° C. for 10 hours. Radical polymerization of the hydroxyethyl methacrylate was initiated under the heating condition, to obtain a PHEMA, covalently bonded to inner surfaces of pores in the porous PTFE.

The porous PTFE having the PHEMA bonded to the pore inner surfaces of the pores was immersed in 100 g of a pyridine solution containing 10% by weight of dimethylaminopyridine. To this was added 450 ml of a dichloromethane solution containing 25% by weight of bis-MPA anhydride, and the mixture was reacted at the room temperature for one week. The bis-MPA anhydride has the following structural formula.

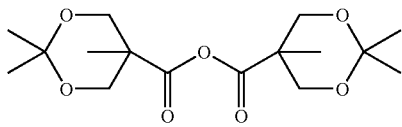

Then, the porous PTFE was immersed in a methanol solution containing 5% by weight of p-toluenesulfonic acid, and reacted at 40° C. for one week. The porous PTFE was taken out and water-washed repeatedly. Thus obtained porous PTFE had a polymer of the following structural formula bonded to the pore inner surfaces. The polymer had a PHEMA main chain and branched side chains containing a first-generation branch composed of bis-MPA.

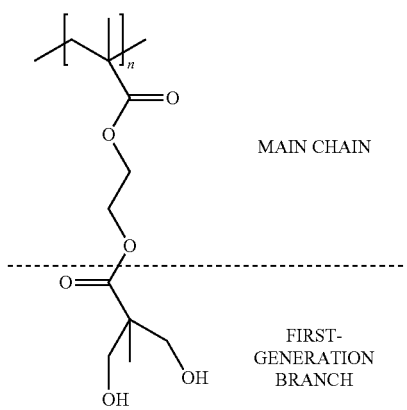

Hereinafter a polymer having a PHEMA main chain and branched side chains composed of bis-MPA is referred to as a PHEMA-PED, and the branch generation number of the polymer is represented in parentheses. Thus, for example, a PHEMA-PED (G1) is a polymer having only a first-generation branch, and a PHEMA-PED (G3) is a polymer having a first- to third-generation branches.

In the structural formula, the dashed line is shown only for the descriptive purpose to clearly distinguish between the main chain and the first-generation branch, and does not represent a bond of a functional group or repeating unit, etc. Dashed lines shown in the following structural formulae have the same meanings as this one.

The above process was repeated twice to obtain a porous PTFE having a PHEMA-PED (G3), represented by the following structural formula.

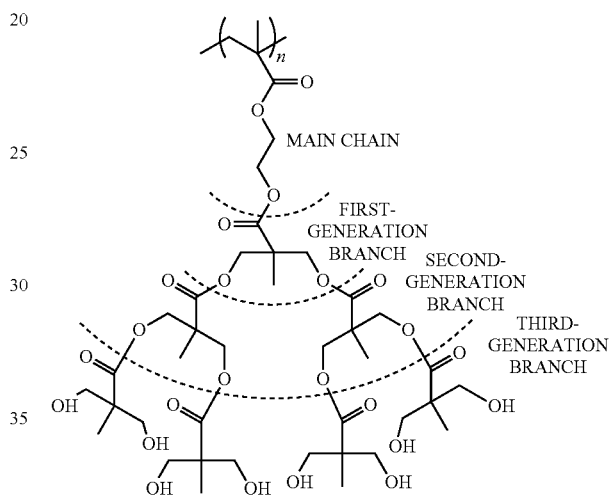

The resultant porous PTFE was immersed in a solution of a sulfoacetic acid dimethylamine salt having the following structural formula heated at 140° C., and the PHEMA-PED (G3) was reacted under reduced pressure with the sulfoacetic acid dimethylamine salt at 140° C. for 10 hours.

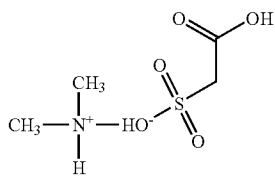

The porous PTFE was taken out and water-washed repeatedly to obtain a proton conductor of Example 1 having a polymer of the following structural formula. In the polymer, the sulfonic acid dimethylamine salt moieties were bonded to the ends of the branched side chains (the third-generation branches).

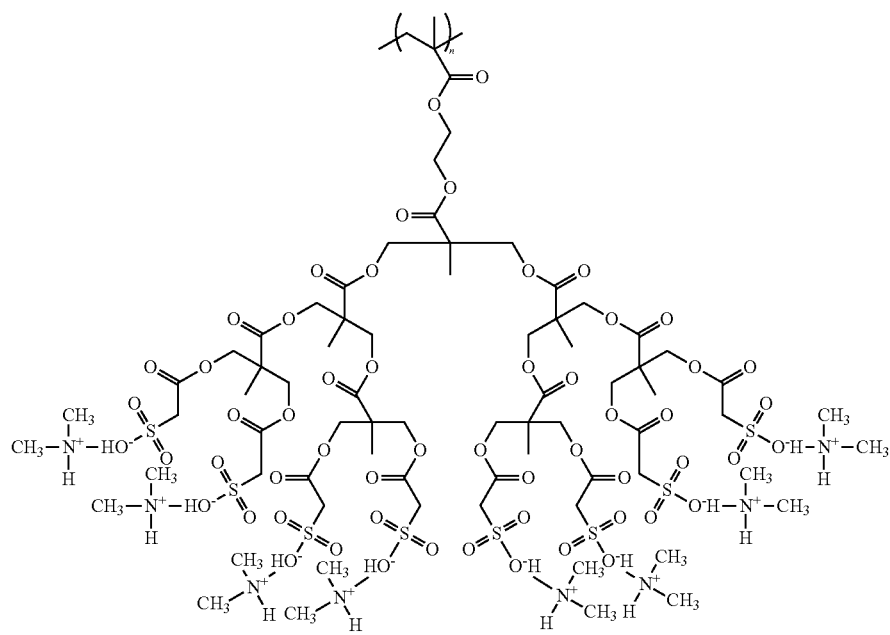

Example 2

A proton conductor of Example 2 was produced in the same manner as in Example 1 except for using a porous polyethylene (PE) as a porous body. In the proton conductor, the sulfoacetic acid dimethylamine salt of the PHEMA-PED (G3) was bonded to pore surfaces of the porous PE.

Example 3

11.4 g of hydroxyethyl methacrylate (HEMA) and 2.4 g of dimethylaminopyridine were dissolved in 35 ml of pyridine. The pyridine solution was mixed with a solution prepared by dissolving 43.4 g of bis-MPA in 10 ml of methylene chloride, and the resultant mixture was reacted at the room temperature for 3 days.

Water was added to the reaction mixture to hydrolyze the excess bis-MPA, the solvents were distilled off, and the residue was washed with water and dried, to obtain a precursor of a condensed product HEMA-PED (G1).

15 g of the precursor was dissolved in 1 L of methanol, and to the obtained solution was added 30 mL of AMBERLITE (an ion-exchange resin available from Organo Corporation). After the mixture was maintained at 40° C. for 7 days, AMBERLITE was removed, and the residue was concentrated, washed with dichloromethane, and dried. Thus, 10 g of an HEMA-PED (G1) having the following structural formula was obtained.

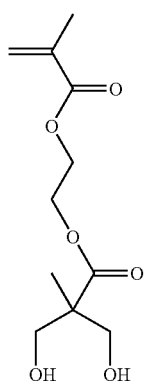

The HEMA-PED (G1) was subjected to the above process, to obtain a precursor of an HEMA-PED (G2) having the following structural formula. The precursor was dissolved in methanol to prepare a solution.

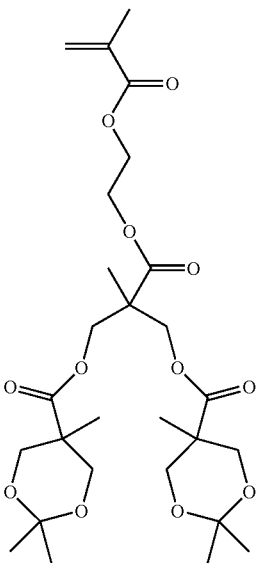

A porous PTFE was irradiated with plasma in the same manner as Example 1, immersed in the above methanol solution, and heated at 70° C. for 10 hours. Radical polymerization of the HEMA-PED (G2) precursor was initiated under the heating condition, to obtain a PHEMA-PED (G2) precursor, covalently bonded to inner surfaces of pores in the porous PTFE. The PHEMA-PED (G2) precursor has the following structural formula.

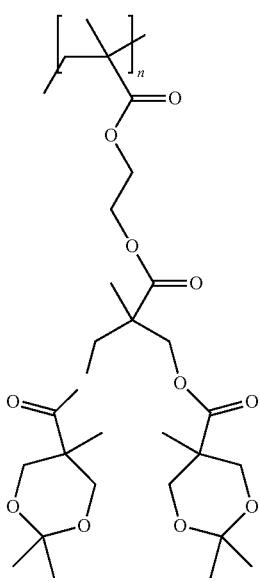

Then, the porous PTFE was immersed in a methanol solution containing 5% by weight of p-toluenesulfonic acid, and reacted at 40° C. for 1 week. The porous PTFE was taken out and water-washed repeatedly. Thus obtained porous PTFE had a PHEMA-PED (G2) bonded to the pore surfaces.

The resultant porous PTFE was immersed in a solution of a sulfoacetic acid dimethylamine salt heated at 140° C., and the PHEMA-PED (G2) was reacted under reduced pressure with the sulfoacetic acid dimethylamine salt at 140° C. for 10 hours. The porous PTFE was taken out and water-washed repeatedly to obtain a proton conductor of Example 3 having a polymer of the following structural formula. In the polymer, the sulfonic acid dimethylamine salt moieties were bonded to the ends of the branched side chains (the second-generation branches).

Example 4

A test sample having a size of 10 mm×30 mm was cut from each of the proton conductors of Examples 1 to 3, and maintained at 120° C. to remove moisture. Two electrodes were attached to one surface of the sample at a predetermined distance respectively, and were electrically connected to an impedance analyzer S-1260 available from Solartron. The impedance of each sample was measured at 120° C. by an alternating current complex impedance method, and the proton conductivity σ (S/cm) of the sample was obtained from the measured value using the following equation (A). In the equation (A), N represents a thickness, M represents a width (10 mm), L represents a distance between the electrodes, and R represents an impedance.

$$\sigma = \frac{L}{R \cdot M \cdot N} \quad (A)$$

A sample having the above size was produced from NAFION 112 (trade name, a proton-conducting polymer containing a sulfonic acid-bonded perfluoropolymer available from DuPont) as Comparative Example. The sample of Comparative Example was dried in vacuum at 80° C., and the proton conductivity σ was obtained in the same manner as in Examples 1 to 3.

The results are shown in FIG. 5. It is clear from FIG. 5 that the porous base bodies used in Examples 1 to 3 have the porosity of 80% by volume, whereby the proton conductivities σ of Examples are higher than that of Comparative Example, even though the proton conductor of Comparative Example is entirely composed of the proton-conducting polymer NAFION and the amounts of the proton-conducting polymers in Examples are smaller than that in Comparative Example. Thus, it is apparent that the proton conductors of Examples 1 to 3 can show sufficient proton conductivities even under a dry state.

Further, the porous PTFE and porous PE having the porosity of 80% by volume are superior in mechanical strength to

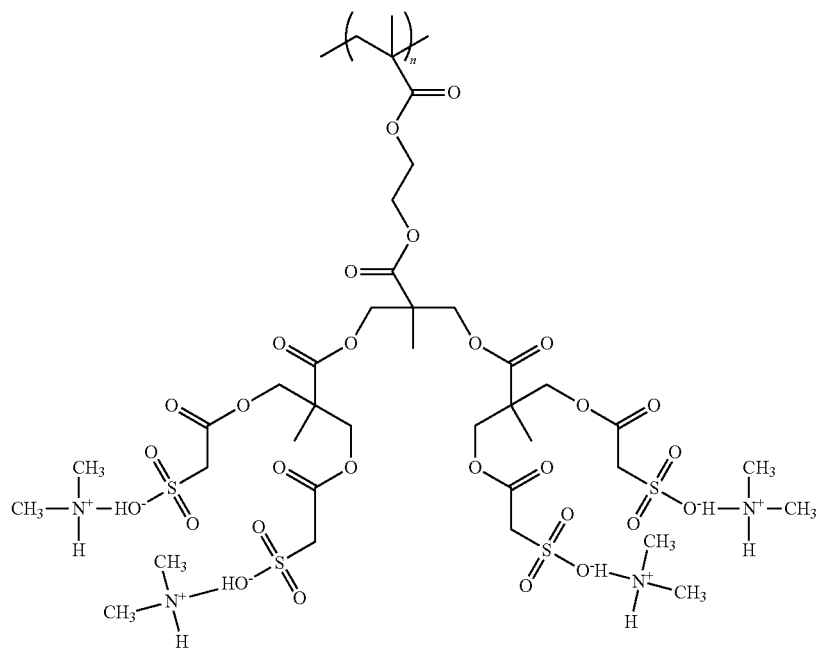

NAFION. Thus, the porous bodies can be used for producing proton conductors with mechanically strength more excellent than that of NAFION.

Although certain preferred embodiments of the present invention have been shown and described in detail, it should be understood that various changes and modifications may be made therein without departing from the scope of the appended claims.

What is claimed is:

1. A proton conductor comprising a porous body having pores for holding proton-conducting polymers therein, the proton-conducting polymers each comprising a linear main chain and a plurality of branched side chains, wherein each of said branched side chains is bonded to said main chain at one end and bonded to a proton-conducting salt at another end, said branched side chains extend radially from said main chain, and said salts of different branched side chains are circumscribed by a virtual circle having a center on the cross-sectional center of said main chain such that a radial direction of the virtual circle is perpendicular to a longitudinal direction of said main chain,
   wherein said proton-conducting polymers that are adjacent to each other have the virtual circles which contact each other,
   wherein said proton-conducting polymers are covalently bonded to said pores and wherein protons are transferred between adjacent salts to achieve proton conduction.

2. A proton conductor according to claim 1, wherein each of said branched side chains of said proton-conducting polymers comprises a dendrimer obtained by repeatedly bonding a repeating unit.

3. A proton conductor according to claim 1, wherein said salt of said proton-conducting polymers is derived from sulfonic acid and a primary or secondary amine.

4. A proton conductor according to claim 1, wherein in said proton-conducting polymers, acid or base for forming said salt forms said salt with one equivalent or less of a corresponding base or acid for forming said salt.

5. A proton conductor according to claim 1, wherein said salt of said proton-conducting polymers is derived from a Brønsted acid and an amine.

6. A proton conductor according to claim 5, wherein said Brønsted acid is sulfonic acid, phosphoric acid, or phosphonic acid.

7. A proton conductor according to claim 5, wherein said amine is ammonia, an aliphatic amine, an alicyclic amine, or a nitrogen-containing heterocyclic compound.

8. A proton conductor according to claim 5, wherein said salt is derived from sulfonic acid and a primary or secondary amine.

9. A proton conductor according to claim 1, wherein said main chain of said proton-conducting polymers comprises a polyvinyl alcohol (PVA) or a polyhydroxyethyl methacrylate (PHEMA), and each of said branched side chains comprises 2,2-bishydroxymethylpropionic acid (bis-MPA).

* * * * *